US009580168B2

(12) United States Patent
Fevergeon et al.

(10) Patent No.: US 9,580,168 B2
(45) Date of Patent: Feb. 28, 2017

(54) COVE LIP DOOR SLAVED TO TRAILING EDGE CONTROL DEVICE

(71) Applicant: The Boeing Company, Chicago, IL (US)

(72) Inventors: Matthew D M Fevergeon, Lake Stevens, WA (US); Jan A. Kordel, Redmond, WA (US); Victor Liu, Everett, WA (US)

(73) Assignee: The Boeing Company, Chicago, IL (US)

( * ) Notice: Subject to any disclaimer, the term of this patent is extended or adjusted under 35 U.S.C. 154(b) by 122 days.

(21) Appl. No.: 14/577,873

(22) Filed: Dec. 19, 2014

(65) Prior Publication Data

US 2016/0176508 A1 Jun. 23, 2016

(51) Int. Cl.
*B64C 9/04* (2006.01)
*B64C 9/02* (2006.01)
(Continued)

(52) U.S. Cl.
CPC .............. *B64C 9/04* (2013.01); *B64C 9/02* (2013.01); *B64C 9/10* (2013.01); *B64C 9/16* (2013.01);
(Continued)

(58) Field of Classification Search
CPC .............. B64C 2009/143; B64C 9/04; B64C 9/16–9/28; B64C 9/02; B64C 9/10; B64C 13/28
See application file for complete search history.

(56) References Cited

U.S. PATENT DOCUMENTS 2,169,416 A * 8/1939 Griswold .................. B64C 9/16
244/216
2,836,380 A * 5/1958 Pearson .................... B64C 9/16
244/216
(Continued)

FOREIGN PATENT DOCUMENTS

EP 2669189 A1 12/2013
GB 2003098 A * 3/1979 ............... B64C 9/16

OTHER PUBLICATIONS google.com, "bell crank"; https://www.google.com/search?q=bell+crank, accessed Oct. 14, 2016.*
(Continued)

*Primary Examiner* — Tien Dinh
*Assistant Examiner* — Alexander V Giczy
(74) *Attorney, Agent, or Firm* — Miller, Matthias & Hull LLP

(57) ABSTRACT

A primary flight control device for an aircraft, such as a flaperon attached to an aircraft wing, utilizes independent yet interactive airgap control systems designed to avoid weight penalties associated with conventionally used cam and track systems. An actuator directly controls movements of the flaperon; the flaperon motion is then used to slave separate movements of secondary flight control devices, such as a flaperon hinge panel and a cove lip door, to various positions of the flaperon for indirect control of aerodynamic air gaps during flight. The use of a bell crank for indirectly slaving the flaperon hinge panel movements to the flaperon avoids conventionally used cam and track systems. Although the cove lip door utilizes a separate linkage system, the bell crank and cove lip door linkage systems work in conjunction to assure desired aerodynamic airflows over the aircraft wing and flaperon structures.

17 Claims, 8 Drawing Sheets

(51) Int. Cl.
*B64C 9/10* (2006.01)
*B64C 9/16* (2006.01)
*B64C 9/18* (2006.01)
*B64C 13/28* (2006.01)
*B64C 9/00* (2006.01)

(52) U.S. Cl.
CPC ............... *B64C 9/18* (2013.01); *B64C 13/28* (2013.01); *B64C 2009/005* (2013.01)

(56) References Cited

U.S. PATENT DOCUMENTS

| | | | |
|---|---|---|---|
| 3,874,617 A | 4/1975 | Johnson | |
| 4,120,470 A | 10/1978 | Whitener | |
| 4,131,252 A * | 12/1978 | Dean | B64C 9/16 244/130 |
| 4,447,028 A * | 5/1984 | Wang | B64C 9/00 244/207 |
| 4,544,118 A * | 10/1985 | Robinson | B64C 9/06 244/215 |
| 4,702,442 A * | 10/1987 | Weiland | B64C 9/16 244/216 |
| 4,705,236 A | 11/1987 | Rudolph | |
| 5,702,072 A * | 12/1997 | Nusbaum | B64C 9/28 244/225 |
| 7,500,641 B2 * | 3/2009 | Sakurai | B64C 9/16 244/215 |
| 7,744,040 B2 | 6/2010 | Lacy et al. | |
| 8,511,608 B1 * | 8/2013 | Good | B64C 9/16 244/214 |
| 8,567,726 B2 | 10/2013 | Lacy et al. | |
| 2005/0011994 A1 | 1/2005 | Sakurai et al. | |
| 2006/0226296 A1 * | 10/2006 | Perez-Sanchez | B64C 9/16 244/215 |
| 2009/0026317 A1 * | 1/2009 | Coughlin | B64C 9/16 244/129.1 |
| 2010/0145555 A1 * | 6/2010 | Hagerott | B64C 9/04 701/3 |
| 2011/0297796 A1 * | 12/2011 | Schlipf | B64C 9/22 244/213 |
| 2012/0012696 A1 * | 1/2012 | Sakurai | B64C 9/16 244/99.3 |
| 2013/0134262 A1 * | 5/2013 | Maclean | B64C 9/02 244/212 |
| 2013/0320151 A1 * | 12/2013 | Kordel | B64C 9/16 244/215 |

OTHER PUBLICATIONS

Search Report for related European Application No. EP 15195881; report dated May 11, 2016.

* cited by examiner

COVE LIP DOOR SLAVED TO TRAILING EDGE CONTROL DEVICE

FIELD

The present disclosure relates generally to aircraft flight control structures and more specifically to apparatus configured for slaving motion of a cove lip door to that of a trailing edge control device.

BACKGROUND

Various control devices are used to effectively and efficiently maneuver aircraft during various phases of flight. Some control devices are directly attached to wings of an aircraft, such as ailerons adapted for controlling "roll", i.e. the rotational movement of an aircraft about its longitudinal axis. Spoilers may also be directly attached to aircraft wings to rapidly reduce wing lift when and as desired, particularly during various descent phases of a flight. Flaps are typically also attached directly to the wings to change their aerodynamic shapes for assuring stable flight control during slower speeds, such as during takeoff and landing phases of flight.

FIG. 1 is a fragmentary schematic view of a wing 10, attached to a fuselage 12, the wing and fuselage together depicting a portion of an aircraft 14 configured in accordance with the described related art. The wing 10 has a forward or leading edge 15 which may include deployable slats 16, as yet another wing control device. The wing also has a trailing edge 17 that includes outboard ailerons 18 and outboard flaps 20. The trailing edge 17 may also include inboard ailerons 22 and inboard flaps 24. As noted earlier, the ailerons are used for roll control of the aircraft 14, while the flaps are utilized to enhance lift control at lower speeds, e.g. for takeoffs and landings.

In some instances, the effective deployment of flaps may require translational movements in addition to their normal downward angular movements from stowed positions for creating spaces and/or gaps that need to be controlled for purposes of aerodynamic efficiency. Thus, arrows 26 and 28 indicate the directions, when deployed, of rearward translational movements of outboard flaps 20 and inboard flaps 24, respectively. Typically, ailerons, including the inboard aileron 22 require no translational movement, as do the dedicated flaps 20, 24.

The translational movement or extensions of outboard and inboard flaps 20, 24 of the convergent wing design of the aircraft wing 10 of FIG. 1 would pose an issue of angular interference, if the respective flaps were immediately adjacent each other. Such interference is avoided, however, by portion of the wing 10 that includes the inboard aileron 22, which is positioned between the flaps 20, 24 and involves no translational deployment.

In large turbofan jet aircraft, the functions of a flap and at least an inboard aileron may often be combined into a single or unitary control device called a flaperon. Since both flaps and ailerons are usually attached to the trailing edges of the aircraft wings, flaperons are also likewise attached. Thus, referring now to FIG. 2, the inboard aileron 22 of the aircraft 14 is shown attached to the trailing edge 32 of the wing 10, as shown at an interface 30 of the leading edge 34 of the inboard aileron 22. It should be noted that the inboard aileron 22 may be rotated about a hinge axis 38 into a rigid downward position 22" (shown in phantom); i.e. deployed from the stowed position shown to a fixed angle along the downward arc of angle B, to function solely as a flap, even though without a gap, since at relatively slower speeds, i.e. during takeoff and landing, the outboard ailerons may be solely relied upon to effectively control roll of the aircraft 14.

Since the inboard aileron 22 also function as a flap, in aviation parlance such control device is also called a "flaperon", to the extent that it may be called upon to selectively perform both aileron or flap functions, depending on circumstances and/or phases of flight.

When functioning as an aileron, the so-called flaperon 22 is rotated upwardly along arc A from its stowed position as shown, up to and including a limit position 22' (shown in phantom), to the extent that a functional aileron must be free to move both upwardly and downwardly. Conversely, the flaperon 22 may be rotated downwardly along arc B from its stowed position, down to and including a limit position 22" (also shown in phantom). Finally, the trailing edge 32 of the wing 10 incorporates an aft-facing cove lip 36, a volume or space in which the leading edge 34 of the flaperon may rotate in close proximity, as depicted in FIG. 2 at the interface 30.

Referring now to FIG. 3, the flap 24 may also be capable of acting as an aileron, and thus as a flaperon. Therefore, the flap 24 may also be variously called a flaperon 24. However, because deployment of the flaperon 24 may involve a translational extension, the physical structure involved in its deployment must accommodate translational in addition to pivotal movement. In the related art structure shown, a hinge panel 40, configured for management of aerodynamic air gaps created during the extension aspect of deployment of the flaperon 24 is coupled to the structure of the cam track mechanism 42 to assure desired angular positioning relative to the wing 10 and the flaperon 24.

Several challenges are presented by such structures adapted to satisfactorily accommodate both angular and translational motion, including the need to assure requisite fail-safe strength and robustness under occasional extreme loads, such as those associated with turbulence and other phenomena routinely encountered in flight. As such, the cam track mechanism 42 includes relatively heavy cam tracks 44 that define paths for cam track rollers 48 that are directly secured to roller links 46. Use of the cam track mechanism 42 has also necessitated the use of a technology called "fusing", for assuring safety in the event of "jamming" of any of the track rollers 38. Since jamming is an issue to be avoided at all costs, at least two roller links are typically riveted together in a cam track-style mechanism 42 (FIG. 3) for appropriate safety redundancy. Such links are designed to fail in a predictable manner, necessitating additional weight that would be preferably avoided.

Thus, it is desirable to provide novel aerodynamic gap control structures to accommodate both angular and translational movements of flaperons, but wherein such structures can retain robustness and yet be lighter in weight, in the face of increasingly stringent aircraft design requirements.

SUMMARY

In accordance with one aspect of the present disclosure, an aircraft wing configured to be fixed to and extend from an aircraft fuselage, the wing having a leading edge and a trailing edge. The trailing edge includes an attached aerodynamic primary control device, the movement thereof subject to an input controller. A moveable aerodynamic cove lip door is proximal to the primary control device, though separately attached to the trailing edge.

In accordance with another aspect of the present disclosure, an actuator is in communication with the control device, and an aircraft input controller is in communication with the actuator, and movement of the control device is subject to the actuator via the input controller.

In accordance with another aspect of the present disclosure, a bell crank mechanism is coupled to a secondary control device, such as a hinge panel, and configured to link movement of the bell crank directly to movement of the secondary control device.

In accordance with yet another aspect of the present disclosure, a cove lip door mechanism controls movement of the cove lip door as an indirect function of movement of the primary control device.

The features, functions, and advantages disclosed herein can be achieved independently in various embodiments or may be combined in yet other embodiments, the details of which may be better appreciated with reference to the following description and drawings.

It should be understood that the drawings are not necessarily to scale, and that the disclosed embodiments are illustrated only schematically. It should be further understood that the following detailed description is merely exemplary and not intended to be limiting in application or uses. As such, although the present disclosure is, for purposes of explanatory convenience, depicted and described in only the illustrative embodiments presented, the disclosure may be implemented in numerous other embodiments, and within various other systems and environments not shown or described herein.

DETAILED DESCRIPTION

The following detailed description is intended to provide both apparatus and methods for carrying out the disclosure. Actual scope of the disclosure is as defined by the appended claims.

Figure 1:
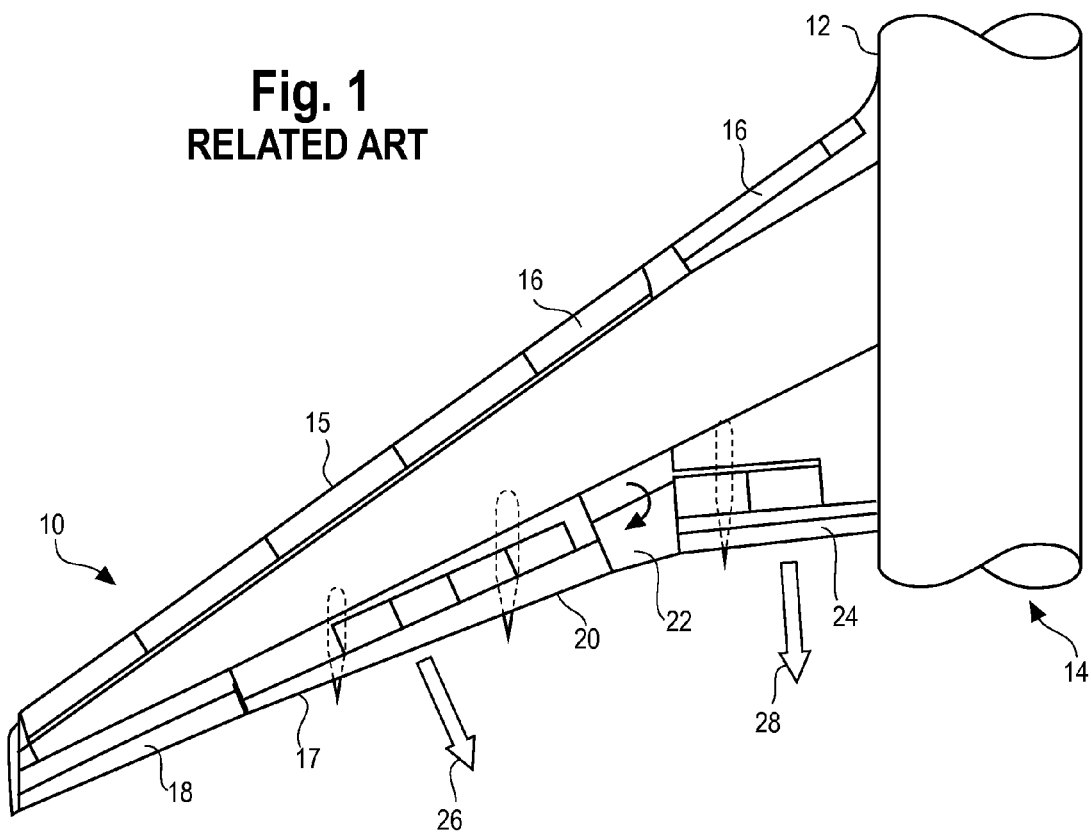
FIG. 1 is a fragmentary plan view of a wing of a commercial aircraft configured in accordance with the related art.
Figure 2:
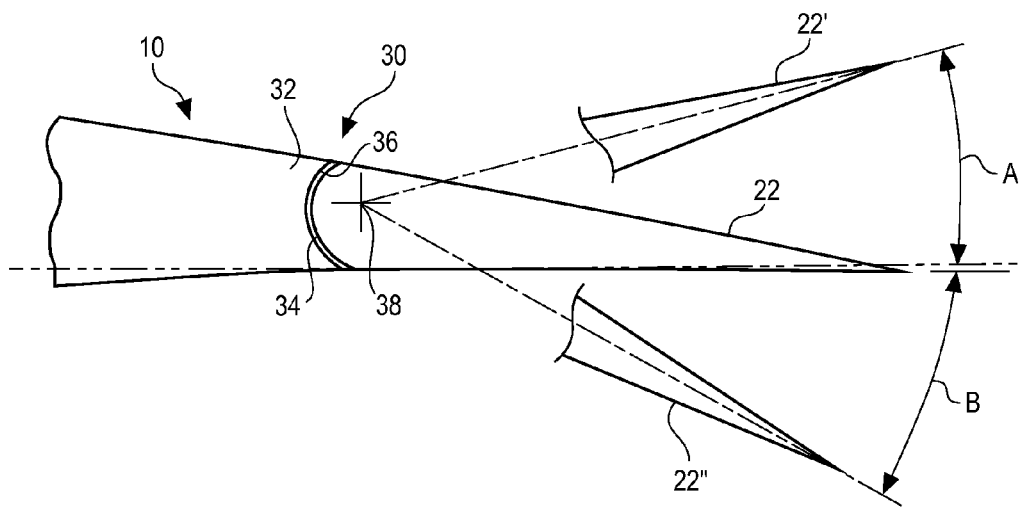
FIG. 2 is a fragmentary schematic elevation view of an inboard aileron of the commercial aircraft of FIG. 1.
Figure 3:
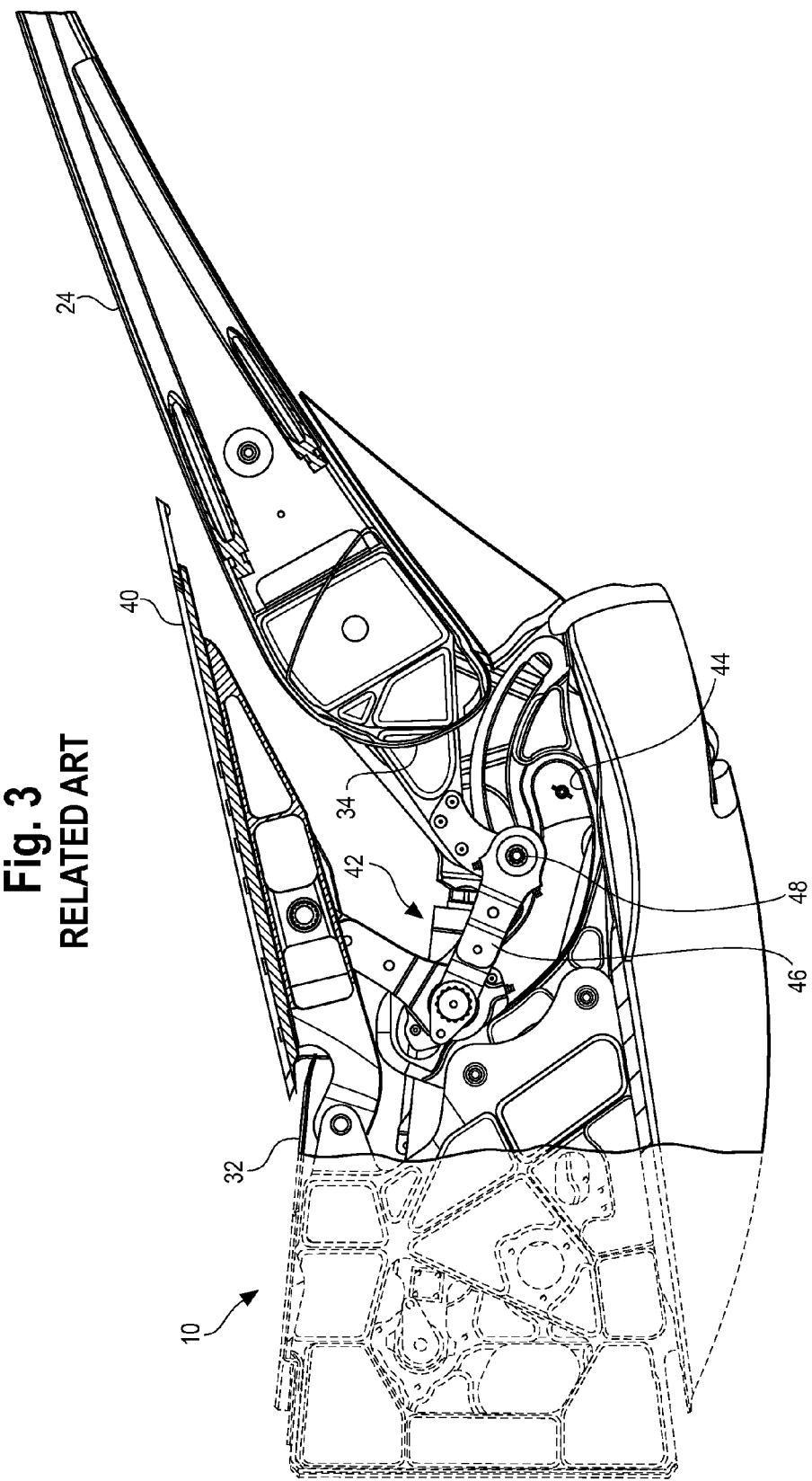
FIG. 3 is a fragmentary elevational view of a cross-section of an inboard flap of the commercial aircraft of FIG. 1.
Figure 4:
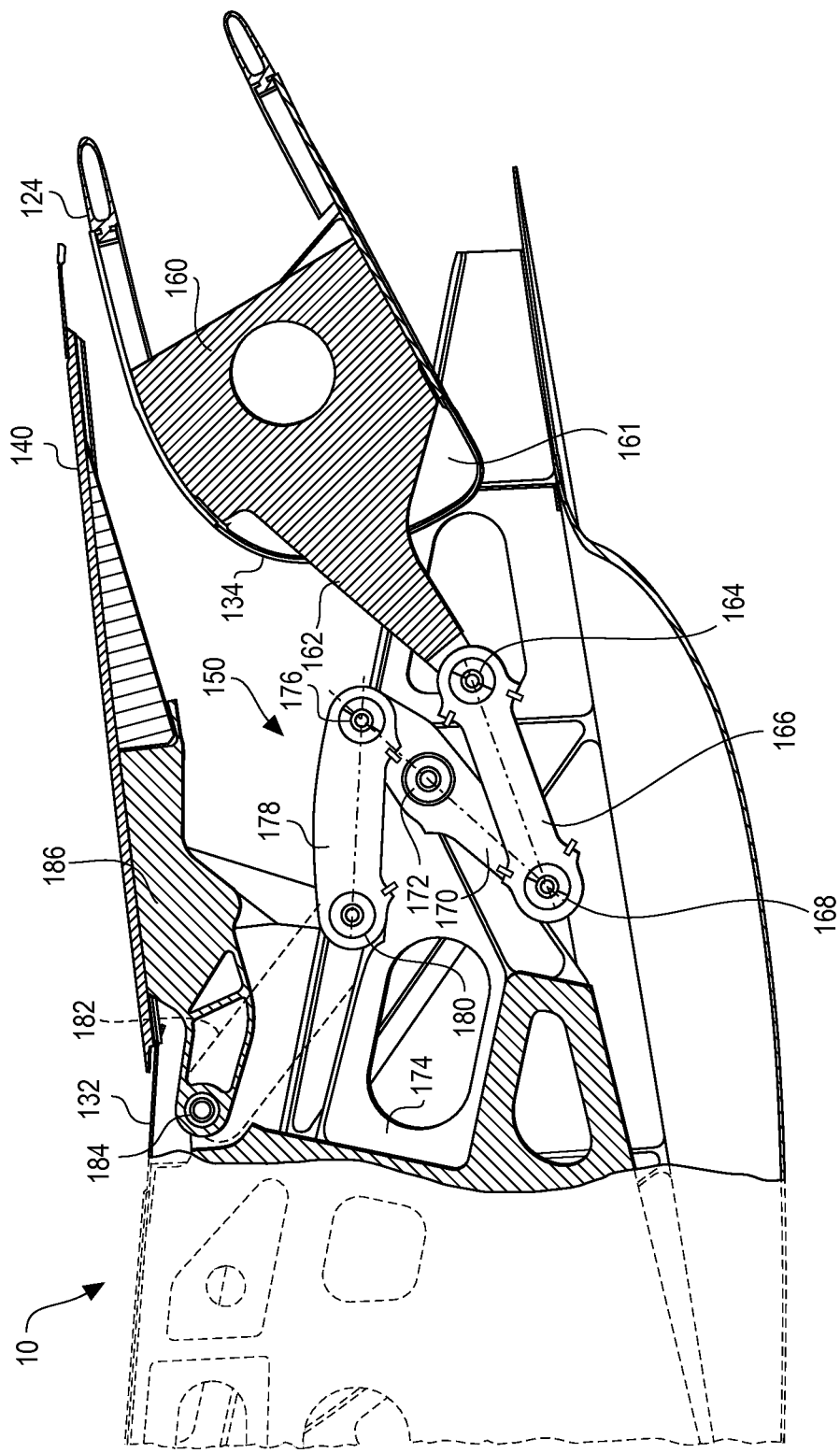
FIG. 4 is a fragmentary elevational view of a cross-section of an inboard flap and hinge panel constructed in accordance with a described embodiment of the present disclosure.

FIG. 4 is an elevational cross-section view of an inboard flap 124, as a primary flight control device, constructed in accordance with one described embodiment of the present disclosure. The inboard flap 124, shown in an upward position while functioning as a flaperon, is relatively movable with respect to the trailing edge 132 of the wing 110. A bell crank mechanism 150 effectively comprises a pair or series of four-bar linkages configured to control movement of a secondary flight control device, such as a separately movable hinge panel 140, thus eliminating the need for the related art cam track mechanism 42 described above.

Continuing reference to FIG. 4, a support header (also generally and commonly called a rib) 160 is a vertically oriented structural member within an interior space 161 of the flap 124. Typically there are a number of such support headers fixed in a parallel, spaced array. In the described embodiment the wing 110, at least two of such support headers 160 of each wing 110 includes an integral flap extension flange 162. Each of the flap extension flanges 162 is coupled directly to a single bell crank mechanism 150. Both bell crank mechanisms 150, 152 (FIG. 6) of each wing 110 operate in concert, as will be appreciated by those skilled in the art. As such, only one of the two mechanisms, i.e. bell crank mechanism 150, will be described herein.

The flap extension flange 162 is coupled via a coupling joint 164 to a bottom or flap link 166. At the forward end of the link 166 is a coupling joint 168 which pivotally secures the link 166 to a center link 170. At an intermediate portion thereof, the center link 170 is fixed to and rotates about a fixed coupling joint 172, which is secured to a support header 174, which is an integral part of the trailing edge 32 the wing 110.

An upper coupling joint 176 of the center link 170 is configured to couple with an upper link 178. It will be appreciated that the latter provides a first, indirect connection to the hinge panel 140. The upper link 178 includes a forward coupling joint 180 adapted to connect directly to hinge panel link 182 (shown in phantom, since hidden behind support structures within the trailing edge 132). A forward coupling joint 184 of the hinge panel link 182 provides a direct connection to a hinge panel support header 186, a structural support member of the hinge panel 140, as depicted.

Figure 5:
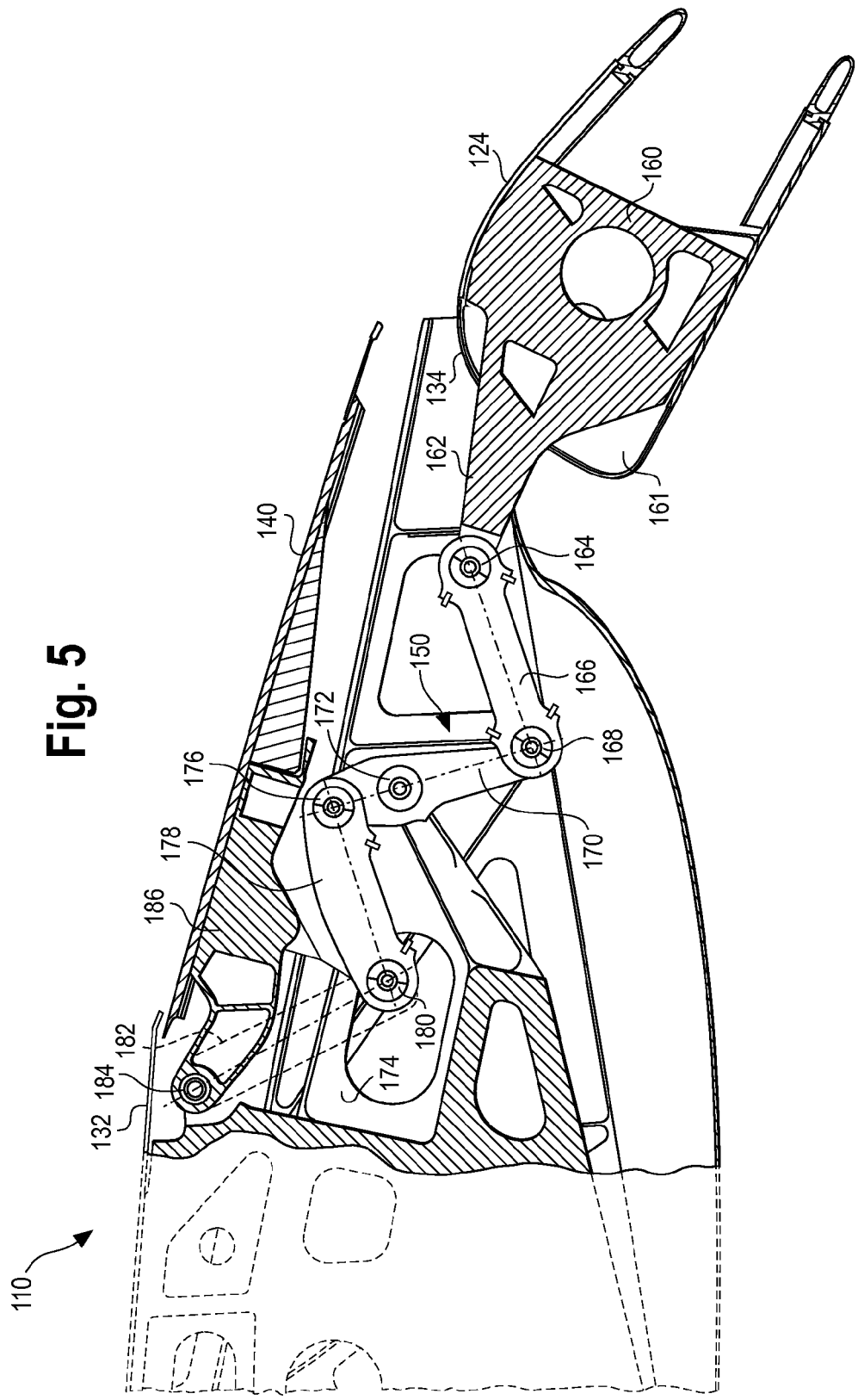
FIG. 5 is a fragmentary elevational view of a cross-section of the same inboard flap and hinge panel constructed in accordance with a described embodiment of the present disclosure, albeit with the flap shown in a different position.

The described elements, including all links and coupling joints (i.e., connections) are maintained in FIG. 5, wherein the inboard flap 124 is shown deployed downwardly, in either a flap or flaperon configuration, as already described. The center link 170 is pivotally connected to, and translationally fixed to the trailing edge 132, for supporting only pivotal movement of the center link relative to the trailing edge. For this purpose, the center link 170 has three connecting joints i.e. coupling joint 168 at one end thereof, shared with the flap link 166, the fixed coupling joint 172 at its center, about which it is pivotally secured to the support header 174, and the upper coupling joint 176, shared with the forward hinge panel link 182.

Those skilled in the art will appreciate that in order to support slaved movement of the bell crank mechanisms 150, 152 with respect to movement of the flap 124 relative to the trailing edge 132, there must be an additional pivotally fixed reactive connection between the flap 124 and the trailing edge 132.

Figure 6:
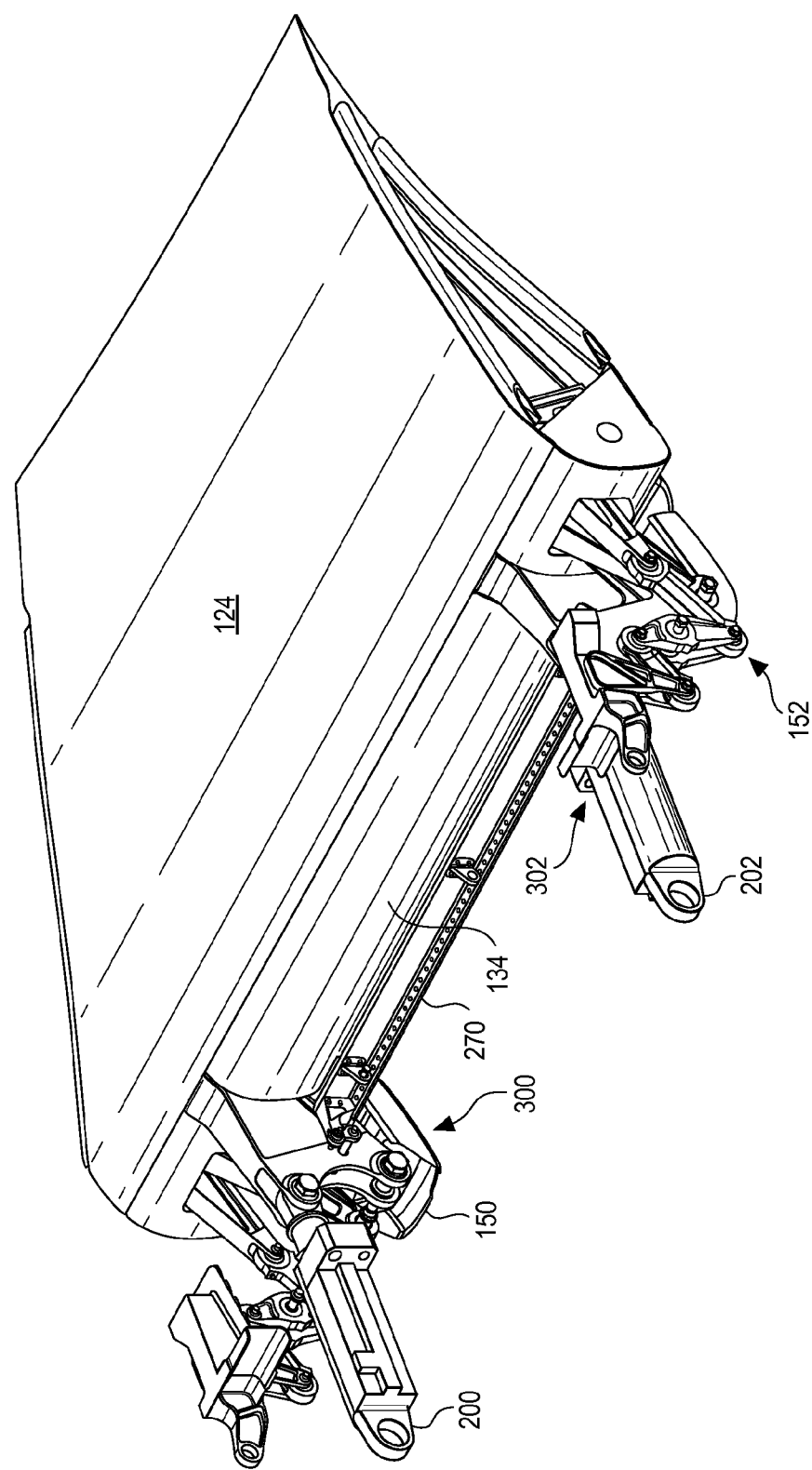
FIG. 6 is a perspective view of the same inboard flap of FIGS. 4 and 5, but including a view of an associated cove lip door.

Referring now to FIG. 6, a perspective view of the flap or flaperon 124 depicts the use of dual bell crank mechanisms 150 axially offset from a pair of spaced cooperating actuators 200 and 202. Those skilled in the art will appreciate that the actuator, at least in this described embodiment, is a device responsible for actual deployment, hence movement of the flap 124 relative to the trailing edge 132 between its limits, as shown in FIGS. 4 and 5. As shown, the actuators 200, 202 include separate direct connections to the flaperon 124, to support primary flight control via the actuators 200, 202.

FIG. 6 also depicts a so-called cove lip door 270. In addition to the described hinge panel 140, the cove lip door is another aerodynamic feature that may be associated with the flaperon 124. The cove lip door 270, essentially a miniature wing-like structure, shown only schematically (thus not revealing its reactive pivotal connection to the trailing edge 132) can provide real-time aerodynamic gap control management, and may be configured to be controllably displaced relative to the flaperon 124 via both rotation and translation motions to manage any air gaps created by the extension (i.e. translational) and rotational movement of the flaperon 124. For this purpose, a cove lip door mechanism 300 can be configured to control movement of the cove lip door 270, and essentially to slave such movement to the movement of the flaperon 124.

Figure 7:
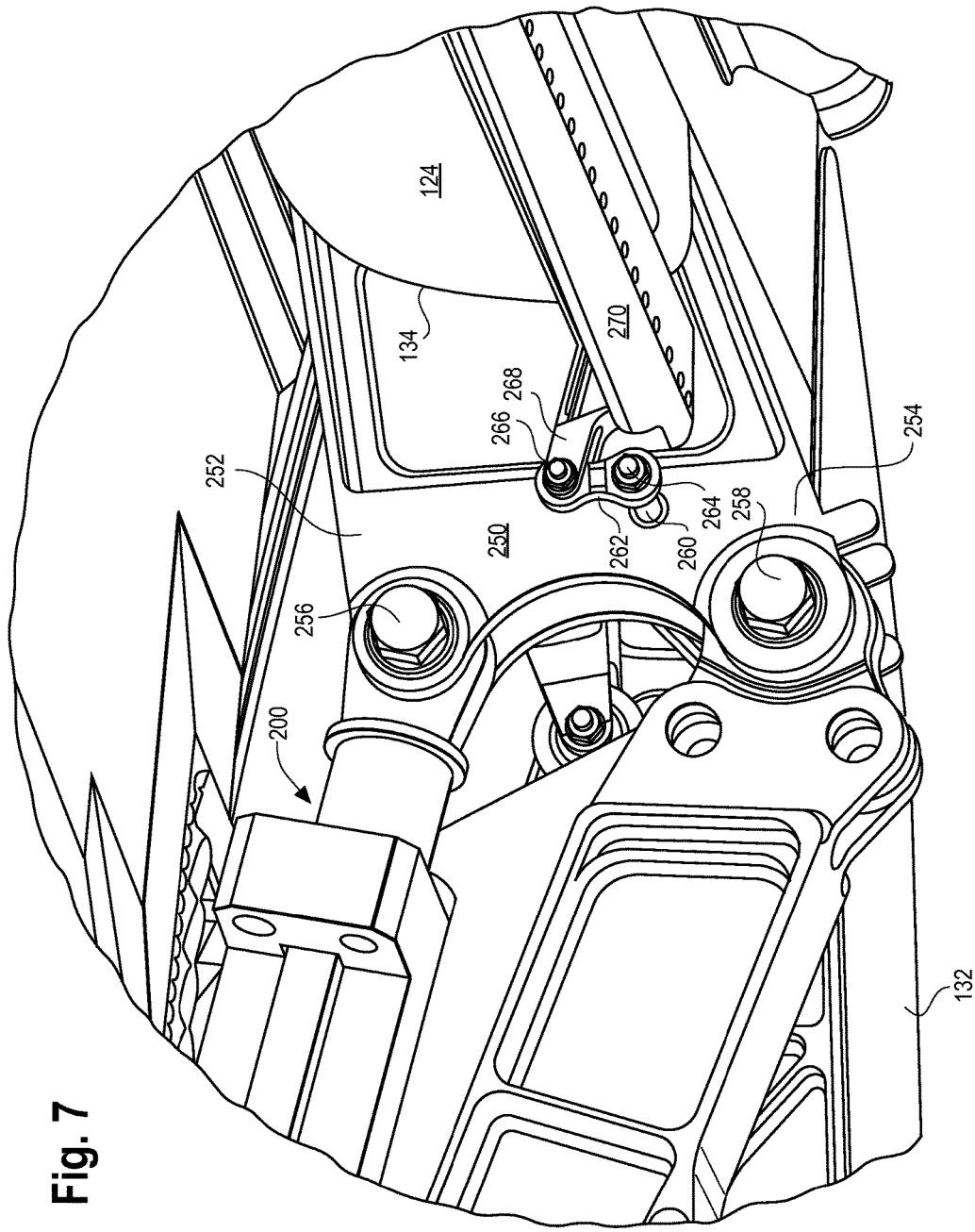
FIG. 7 is a perspective schematic view of the same inboard flap of FIGS. 4 and 5, but including a view of the flap actuator structure in relation to the flap lip.

Referring now to FIG. 7, one end of the actuator 200 is shown coupled to an actuator pivot link 250 while the flaperon 124 is in a stowed position, such as during a cruise phase of flight. The actuator pivot link 250 has a first end 252 and a second end 254. The first end 252 thereof is secured to the actuator 200 via joint 256, the latter coupling the actuator 200 directly to the actuator pivot link 250 to support pivotal motion of the two members relative to the other.

The second end 254 of the actuator pivot link 250 contains a joint 258 that is fixed to the trailing edge 132, and thus allows the actuator pivot link 250 to pivot about the trailing edge 132 at the joint 258. Movement of the cove lip door 270 is controlled by such pivotal action of the actuator pivot link 250. For this purpose, a cove lip door drive arm 260 is secured to a drive link 262, having first and second jointed ends 264, 266, respectively, as shown. At the first jointed end 264, the drive arm 260, is secured to the actuator pivot link 250 at a position intermediate of respective first and second ends 252, 254, to provide a location about which the drive link 262 pivots on the actuator pivot link 250. On the other hand, a cove lip door hinge 268 at the jointed end 266, is configured to connect directly to the cove lip door 270, and thus pivots about the first jointed end 264.

Figure 8:
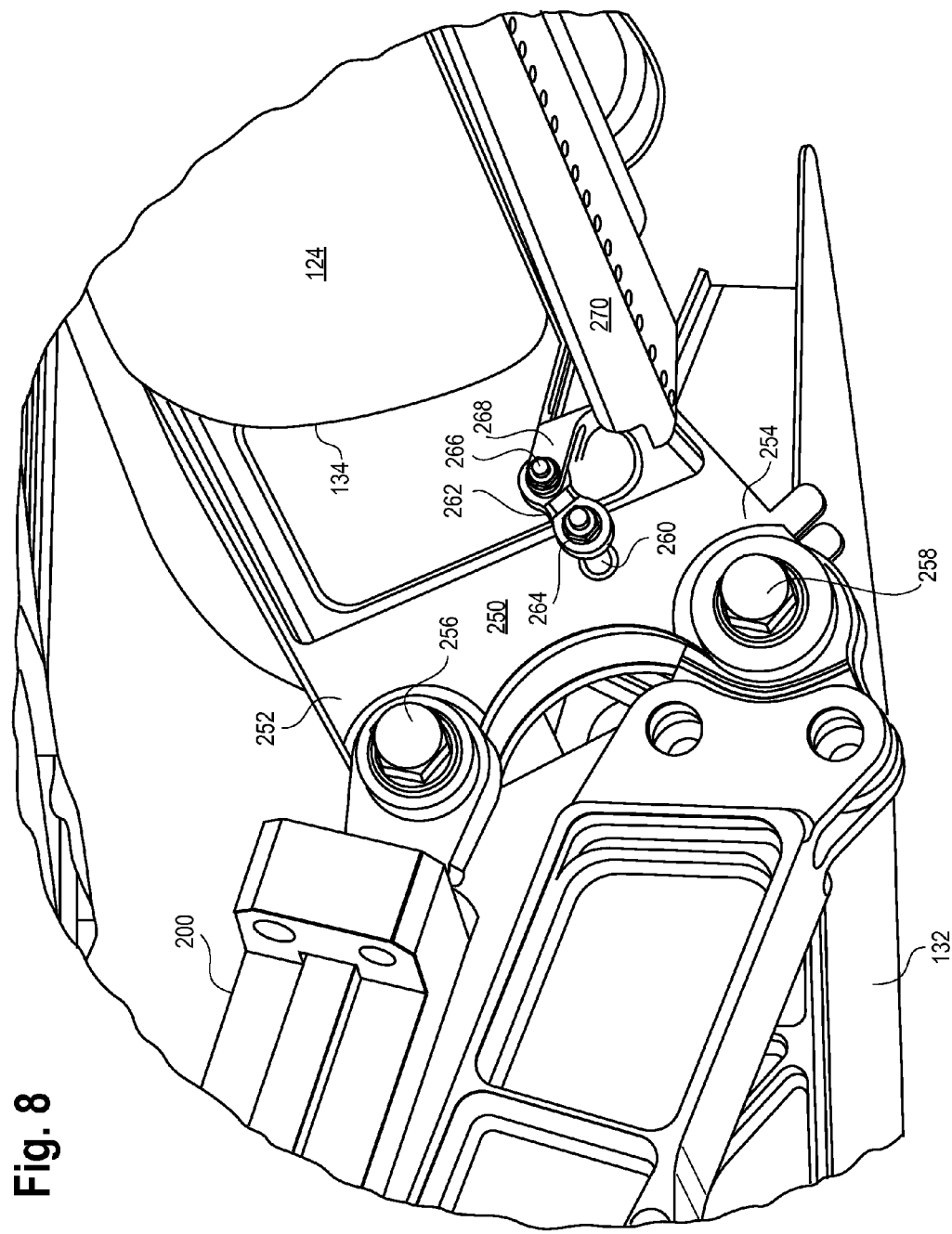
FIG. 8 is a perspective schematic view of the same inboard flap and flap actuator structure of FIG. 7, albeit with the flap shown in a different position.

FIG. 8 depicts the flaperon and cove lip door structures in a flaperon "up position" such as during cruise when the flaperon is operating as an inboard aileron, described above. All of the aforementioned structures have connective relationships and associations as described, albeit the cove lip door 270 is shown in a different position relative to the flaperon 124.

Figure 9:
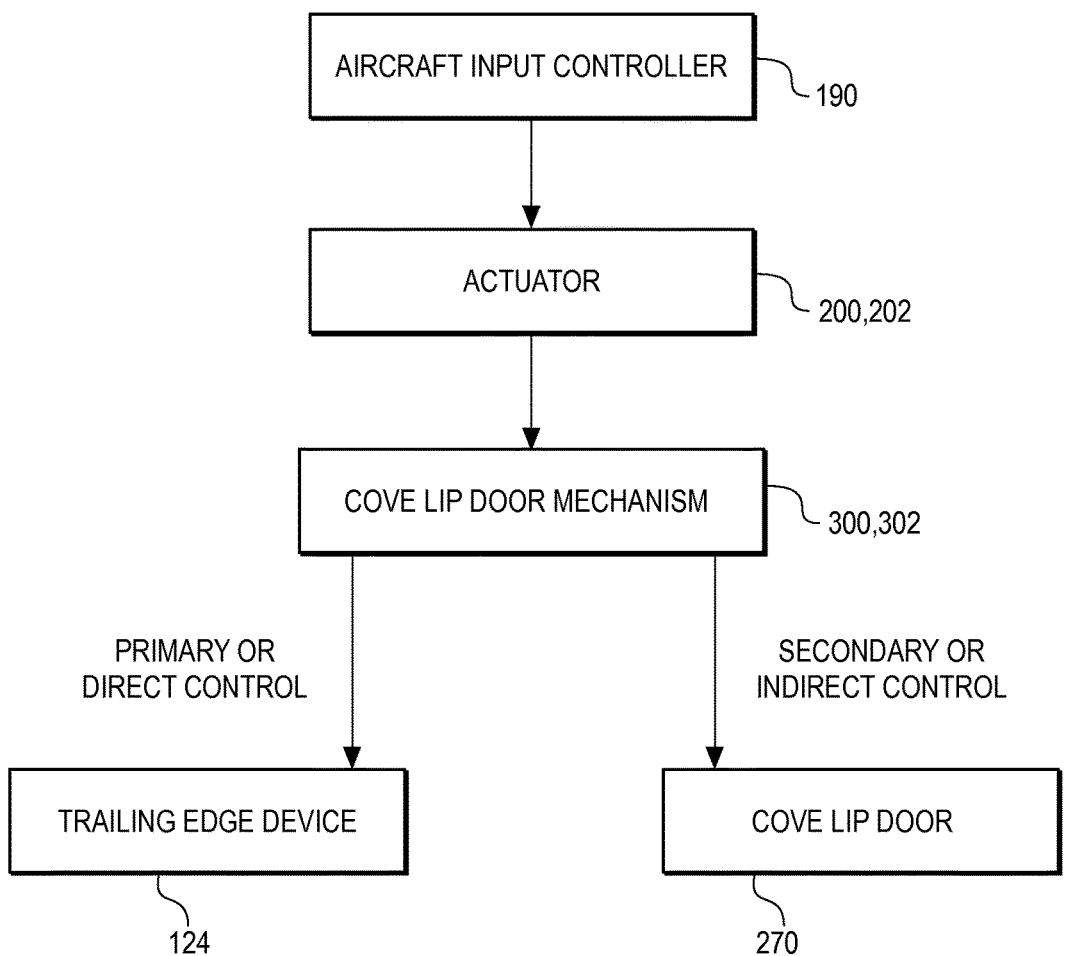
FIG. 9 is a flowchart depicting relationships among aircraft components of the present disclosure.

FIG. 9 provides a flowchart depicting the relationship of the aircraft input controller 190 to the actuators 200, 202 (two per wing in the disclosed embodiment). To the extent that the actuators are directly connected to and engaged with the cove lip door mechanisms 300, 302 (two per wing in the disclosed embodiment), and are thus configured to move respective cove lip door actuator pivot links in the described manner, it will be apparent to those skilled in the art that primary or direct control of the trailing edge device 124 is an intended response of the aircraft input controller 190, as described in detail herein. On the other hand, the input controller 190 is configured to provide a secondary, indirect, or slaved control of the cove lip door 270, thus causing a desired follower movement of the cove lip door relative to any direct actuation of a trailing edge device, such as the flaperon 124.

Finally, a method of slaving motion of a cove lip door to that of a trailing edge device may include steps of providing a cove lip door control mechanism for an aircraft wing, the wing configured to be fixed to and extend from an aircraft fuselage, the wing having a leading edge and a trailing edge. The steps may include providing a primary aerodynamic control device and attaching the primary control device to the trailing edge and providing an actuator configured to operate the control device. The steps may further include providing an aircraft input controller configured to move the actuator, wherein movement of the primary control device is subject to the actuator via the input controller. Finally, the steps may further include providing a bell crank mechanism coupled to a secondary control device, and configured to link movement of the actuator directly to movement of the secondary control device, and providing a moveable aerodynamic cove lip door proximal to the primary control device, the cove lip door separately attached to the trailing edge for the actuator to also control movement of the cove lip door as an indirect function of movement of the control device.

Those skilled in the art will appreciate that the structures described, including the actuator pivot link 250, drive arm 260, and drive link 262, as associated with the cove lip door 270 may offer numerous benefits over related art. Moreover, by use of the bell cranks 150, 152 for control of the flaperon hinge panel 140, not only is a cam track weight penalty avoided, but above-described fusing requirements can be avoided as well. With particular respect to use of the bell cranks, additional benefits are reduction in manufacturing complexity associated with cam track mechanisms, and avoidance of issues inherent to cam track mechanisms, including gouging or fracture damage, and/or imposition of increased loading on structures, from deleterious accumulations of wear particle debris within cam track surfaces, for example.

In addition, the disclosure may also cover numerous additional embodiments. For example, the lengths of each link may be adjusted to support various aerodynamically distinct flight circumstances and/or surface geometries for minimizing interference drag coefficients, including those related to skin friction, parasitic and separation drag, as well as wave drag. As such, particular forms and shapes of the links, for example, may be adjusted to optimize desired gaps controlled by the cove lip door for optimizing flight performance characteristics.

What is claimed is:

1. An aircraft wing configured to be fixed to and extend from an aircraft fuselage, the wing having a leading edge;
   a trailing edge;
   a primary control device attached to the trailing edge, a linear actuator in communication with the control device, and an aircraft input controller in communication with the linear actuator, wherein movement of the primary control device is subject to the linear actuator via the input controller;
   a bell crank mechanism coupled to a secondary control device, and configured to link movement of the linear actuator indirectly to movement of the secondary control device, and
   a moveable aerodynamic cove lip door proximal to the primary control device, the cove lip door separately attached to the trailing edge via a cove lip door hinge coupled to an actuator pivot link, the actuator pivot link also attached to the trailing edge;
   wherein movement of the cove lip door is an indirect function of movement of the primary control device.

2. The aircraft wing of claim 1, wherein the bell crank mechanism is also attached to the trailing edge.

3. The aircraft wing of claim 1, further comprising the actuator pivot link having first and second ends, the actuator being coupled to the linear actuator pivot link at the first end, and the actuator pivot link pivotally connected to, and translationally fixed to, the trailing edge at the second end, and wherein the bell crank mechanism includes a center link also pivotally connected to, but translationally fixed to, the trailing edge.

4. The aircraft wing of claim 3, further comprising a cove lip door drive arm, a cove lip door drive link fixed to the drive arm, and the cove lip door hinge connected to the cove lip door, the cove lip door drive arm being secured to the actuator pivot link at a position between the first and second ends of the actuator pivot link, wherein the cove door drive link also has first and second ends, the first end of the cove door drive link being rotatably secured to the cove lip door drive arm, and the second end of the cove door drive link rotatably secured to the cove lip door hinge, and wherein movement of the linear actuator moves the actuator pivot link, causing pivotal movement of the cove lip door relative to the trailing edge.

5. The aircraft wing of claim 4, wherein the actuator pivot link and the drive arm both rotate relative to the trailing edge about the second end of the actuator pivot link.

6. The aircraft wing of claim 1, wherein the primary control device is a flaperon.

7. The aircraft wing of claim 1, further comprising at least two bell crank mechanisms, and wherein the secondary control device is a hinge panel.

8. A cove lip door control mechanism secured to an aircraft wing, the wing having a leading edge and a trailing edge and having a primary control device attached to the trailing edge, and a moveable aerodynamic cove lip door proximal to the primary control device, the cove lip door being separately attached to the trailing edge, wherein the cove lip door control mechanism comprises:
   a linear actuator, and an aircraft input controller, wherein movement of the primary control device is subject to the linear actuator via the input controller;
   a bell crank mechanism coupled to a secondary control device, and configured to link movement of the linear actuator indirectly to movement of the secondary control device;
   a cove lip door hinge on the cove lip door for coupling the cove lip door to an actuator pivot link, the actuator pivot link also attached to the trailing edge;
   wherein movement of the cove lip door is an indirect function of movement of the primary control device, wherein movement of the cove lip door is slaved to movement of the primary control device.

9. The cove lip door control mechanism of claim 8, further comprising the linear actuator pivot link having first and second ends, the actuator being coupled to the actuator pivot link at the first end, and the actuator pivot link pivotally connected to, and translationally fixed to, the trailing edge at the second end, and wherein the bell crank mechanism includes a center link pivotally connected to, but translationally fixed to, the trailing edge.

10. The cove lip door control mechanism of claim 9, further comprising a cove lip door drive arm, a cove lip door drive link, and the cove lip door hinge, the cove lip door drive arm being secured to the actuator pivot link at a position between the first and second ends of the actuator pivot link, wherein the cove door drive link also has first and second ends, the first end of the cove door drive link being rotatably secured to the cove lip door drive arm, and the second end of the cove door drive link rotatably secured to the cove lip door hinge, and wherein movement of the linear actuator moves the actuator pivot link, causing pivotal movement of the cove lip door relative to the trailing edge.

11. The cove lip door control mechanism of claim 10, wherein the actuator pivot link and the drive arm both rotate relative to the trailing edge about the second end of the actuator pivot link.

12. The cove lip door control mechanism of claim 11, further comprising at least two bell crank mechanisms, and wherein the secondary control device is a hinge panel.

13. The cove lip door control mechanism of claim 11, wherein the actuator pivot link and the center link of the bell crank mechanism are spaced apart.

14. The cove lip door control mechanism of claim 8, wherein the cove lip door control mechanism is configured to impart reciprocal motion to the actuator pivot link.

15. The cove lip door control mechanism of claim 14, wherein the primary control device is a flaperon.

16. A method of slaving motion of an aircraft cove lip door to movement of a primary flight control device, the method comprising the steps of:
   providing a cove lip door control mechanism for an aircraft wing, the wing configured to be fixed to and extend from an aircraft fuselage, the wing having a leading edge and a trailing edge;
   providing a primary control device and attaching the primary control device to the trailing edge;
   providing a linear actuator configured to operate the primary control device;
   providing an aircraft input controller configured to move the linear actuator, wherein movement of the primary control device is subject to the linear actuator via the input controller;
   providing a bell crank mechanism coupled to a secondary control device, and configured to link movement of the linear actuator directly to movement of the secondary control device;
   providing a cove lip door having a hinge, the hinge coupled to an actuator pivot link, and attaching the actuator pivot link to the trailing edge;
   providing a moveable aerodynamic cove lip door proximal to the primary control device, the cove lip door separately attached to the trailing edge; and
   configuring movement of the cove lip door to be an indirect function of movement of the primary control device.

17. The method of claim 16, including a further step of providing the actuator pivot link configured to be directly slaved to movement of the primary control device.

* * * * *